(12) United States Patent
Pei et al.

(10) Patent No.: US 9,787,517 B2
(45) Date of Patent: Oct. 10, 2017

(54) COARSE TIMING

(71) Applicants: Wenjiang Pei, Shanghai (CN); Jinguang Hao, Shanghai (CN); Kai Wang, Shanghai (CN); Qingshan Zhang, Shanghai (CN)

(72) Inventors: Wenjiang Pei, Shanghai (CN); Jinguang Hao, Shanghai (CN); Kai Wang, Shanghai (CN); Qingshan Zhang, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 14/771,795

(22) PCT Filed: Apr. 1, 2013

(86) PCT No.: PCT/CN2013/073565
§ 371 (c)(1),
(2) Date: Aug. 31, 2015

(87) PCT Pub. No.: WO2014/161135
PCT Pub. Date: Oct. 9, 2014

(65) Prior Publication Data
US 2016/0028576 A1  Jan. 28, 2016

(51) Int. Cl.
*H04J 11/00* (2006.01)
*H04L 27/26* (2006.01)

(52) U.S. Cl.
CPC ...... *H04L 27/2656* (2013.01); *H04L 27/2663* (2013.01); *H04L 27/2671* (2013.01)

(58) Field of Classification Search
CPC ............ H04L 27/2663; H04L 27/2665; H04L 27/2657
See application file for complete search history.

(56) References Cited

U.S. PATENT DOCUMENTS

| 7,274,757 B1 | 9/2007 | Zhou et al. |
| 7,693,129 B1* | 4/2010 | Kishore ............. H04L 27/2656 370/210 |
| 2006/0203921 A1 | 9/2006 | Wang et al. |
| 2006/0222095 A1 | 10/2006 | Niu et al. |

(Continued)

FOREIGN PATENT DOCUMENTS

| CN | 101911628 A | 12/2010 |
| WO | 2011095848 A | 8/2011 |

OTHER PUBLICATIONS

International Search Report Application No. PCT/CN2013/073565, dated Jan. 9, 2014.

(Continued)

*Primary Examiner* — Shaq Taha
(74) *Attorney, Agent, or Firm* — Artegis Law Group, LLP

(57) ABSTRACT

A coarse timing method for a communication system is provided. The coarse timing method may include: calculating timing metric values for received signal samples using a self-correlation based timing metric function; calculating average timing metric values based on previous timing metric values; and determining whether there is a data frame based on the timing metric values and the average timing metric values.

8 Claims, 3 Drawing Sheets

(56) References Cited

U.S. PATENT DOCUMENTS

| | | | |
|---|---|---|---|
| 2007/0086328 A1* | 4/2007 | Kao | H04L 27/2657 370/208 |
| 2007/0217524 A1* | 9/2007 | Wang | H04L 27/2656 375/260 |
| 2008/0165910 A1* | 7/2008 | Shi | H04J 11/0069 375/365 |
| 2010/0135447 A1 | 6/2010 | Sapozhnykov et al. | |
| 2013/0064124 A1* | 3/2013 | Sun | H04L 7/042 370/252 |
| 2014/0354794 A1* | 12/2014 | Imamura | A61B 3/1025 348/78 |

OTHER PUBLICATIONS

Extended European Search Report Application No. 13881379.5, dated Oct. 18, 2016, 8 pages.

* cited by examiner

COARSE TIMING

CROSS-REFERENCE TO RELATED APPLICATIONS

The present application is a national stage application of international application number PCT/CN2013/073565 titled, "COARSE TIMING," filed on Apr. 1, 2013. The subject matter of this related application is hereby incorporated herein by reference.

TECHNICAL FIELD

The present application generally relates to coarse timing for communication systems, more specifically, for OFDM communication systems.

BACKGROUND

IEEE 802.11p protocol, which is also called Wireless Access in Vehicular Environment (WAVE), is an approved amendment to the IEEE 802.11. It is an extension of IEEE 802.11 and conforms to corresponding applications in Intelligent Transportation System (ITS).

Similar with other 802.11 family members, frame synchronization of 802.11p mainly depends on short and long training sequences. An example of such training sequences is illustrated in FIG. 1. In this example, there are ten short training sequences $t_1 \sim t_{10}$ and two long training sequences $T_1 \sim T_2$, and the total training time is 32 µs.

In some conventional methods, frame synchronization is split into a coarse timing process and a fine timing process. In the coarse timing process, the position of a data frame is approximately located using a first pre-set threshold and a first timing metric function based on self-correlation of the received signal. In the fine timing process, the position of the data frame transmitted in the first path is located using a second pre-set threshold and a second timing metric function based on cross-correlation between the received signal and the known training sequence. A data frame means a data packet containing certain training sequences and payload.

In such methods, the second timing metric function based on cross-correlation is used only when a data frame is detected. Since computation based on self-correlation has low complexity and relatively low precision, and computation based on cross-correlation has relatively high complexity and high precision, relatively high precision at relatively low computation complexity can be achieved by such combination.

The S&C algorithm is taken as an example to illustrate a conventional coarse timing method.

A timing metric function may be defined as Equation (1), $$M_1(d) = \frac{|P(d)|^2}{R^2(d)} \quad \text{Equation (1)}$$

where d represents position along time axis.
P(d) may be defined as Equation (2), $$P(d) = \sum_{k=0}^{N/2-1} r(d+N/2+k)r(d+k) \quad \text{Equation (2)}$$

where r(n) represents the received signal, and N represents the length of a short training sequence.

R(d) may be defined as Equation (3).

$$R(d) = \sum_{k=0}^{N/2-1} |r(d+N/2+k)|^2 \quad \text{Equation (3)}$$

A threshold $C_{th}$ may be pre-set. If there are a predetermined number of consecutive timing metric values greater than $C_{th}$, it indicates that there is a data frame, and coarse timing ends. If $M_1(d) \leq C_{th}$, it indicates that there is no data frame, and coarse timing continues. An example of how a data frame is found is shown in FIG. 2.

However, related parameters of a signal channel may change such as due to different kinds of fading. As a result, a pre-set threshold may cause errors in certain cases. For example, in some cases, the pre-set threshold may be too low, and noise may be identified as a data frame by mistake. In some cases, the pre-set threshold may be too high, and the beginning part of a frame may be missed. Therefore, more robust coarse timing methods and systems are needed.

SUMMARY

In one embodiment, a coarse timing method for a communication system is provided. The coarse timing method may include: calculating self-correlation based timing metric values for received signal samples; calculating average timing metric values based on previous timing metric values for the received signal samples; and determining whether there is a data frame based on the timing metric values and the average timing metric values.

In some embodiments, the method may further include: if there are Q consecutive timing metric values greater than corresponding average timing metric values, determining that there is a data frame, where Q is a predetermined positive integer. In some embodiments, Q may be great enough but not too great such that a data frame is not likely to be missed and noise is not likely to be identified as a data frame by mistake. In some embodiments, the method may further include: determining that the data frame substantially begins from a signal sample corresponding to the first of the Q consecutive timing metric values greater than corresponding average timing metric values.

In some embodiments, for a received signal sample, a corresponding average timing metric value may be an average timing metric value calculated for the signal sample. In some embodiments, for a received signal sample, a corresponding average timing metric value may be the greatest one of average timing metric values calculated for the current signal sample and signal samples prior to the current signal sample.

In some embodiments, the method may further include: if there are Q timing metric values greater than corresponding average metric values in a time window having a predetermined length L, determining that there is a data frame, where L is greater than Q. In some embodiments, the method may further include: determining that the data frame starts from a signal sample corresponding to the end of the time window.

In some embodiments, the timing metric values may be calculated according to Equation (1):

$$M_1(d) = \frac{|P(d)|^2}{R^2(d)}, \qquad \text{Equation (1)}$$

where d stands for position on the time axis,
where P(d) may be defined as Equation (2):

$$P(d) = \sum_{k=0}^{N/2-1} r(d+N/2+k)r(d+k), \qquad \text{Equation (2)}$$

where r(n) represents the received signal, and N is a predetermined positive integer,
and where R(d) may be defined as Equation (3):

$$R(d) = \sum_{k=0}^{N/2-1} |r(d+N/2+k)|^2. \qquad \text{Equation (3)}$$

N may be any suitable positive integer. For example, N may be 4, 5, 6, 7, 8, 9, 10, 16, 32 etc. In some embodiments, N may be set to the length of a short training sequence.

In some embodiments, an average timing metric value may be calculated based on M consecutive previous timing metric values, where M is a predetermined positive integer.

In some embodiments, the average timing metric values may be calculated according to Equation (4):

$$M_{avg} = \frac{1}{M} \sum_{k=0}^{M-1} M_1(d-k). \qquad \text{Equation (4)}$$

M may be any suitable positive integer. For example, M may be 2, 3, 4, 5, 6, 7, 8, 9, 10, 12, 14, 16, 18, 20 etc. In some embodiments, M may be set to half of the length of a short training sequence.

The above equations may be modified in many ways, and are not intended to be in any way limiting. For example, Equation (4) may be modified into Equation (5):

$$M_{avg} = \frac{1}{M-1} \sum_{k=1}^{M-1} M_1(d-k). \qquad \text{Equation (5)}$$

In some embodiments, the communication system is an Orthogonal Frequency Division Multiplexing (OFDM) communication system.

In one embodiment, a coarse timing system for a communication system is provided. The coarse timing system may include: a timing metric value calculating device for calculating self-correlation based timing metric values of received signal samples; an average timing metric value calculating device for calculating average timing metric values based on previous timing metric values for the received signal samples; and a data frame detecting device for determining whether there is a data frame based on the timing metric values and the average timing metric values.

In some embodiments, if there are Q consecutive timing metric values greater than corresponding average timing metric values, the data frame detecting device determines that there is a data frame, where Q is a predetermined positive integer. In some embodiments, the data frame detecting device may further determine that the data frame substantially starts from a signal sample corresponding to the first of the Q consecutive timing metric values.

In some embodiments, if there are Q timing metric values greater than corresponding average metric values in a time window having a predetermined length L, the data frame detecting device determines that there is a data frame, where L is greater than Q. In some embodiments, the data frame detecting device may further determine that the data frame substantially starts from a signal sample corresponding to the end of the time window.

In some embodiments, the coarse timing system may further include a counter for counting timing metric values greater than corresponding average timing metric values.

In one embodiment, a coarse timing system for a communication system is provided. The coarse timing system may include: means for calculating timing metric values of received signal samples based on self-correlation; means for calculating average timing metric values for the received signal samples based on previous timing metric values; and means for determining whether there is a data frame based on the timing metric values and the average timing metric values.

In one embodiment, a computer readable medium, which contains therein a computer program, is provided. When the computer program is executed by a processor, the processor can be instructed to: calculate timing metric values of received signal samples based on self-correlation; calculate average timing metric values for the received signal samples based on their previous timing metric values; and determine whether there is a data frame based on the timing metric values and the average timing metric values.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
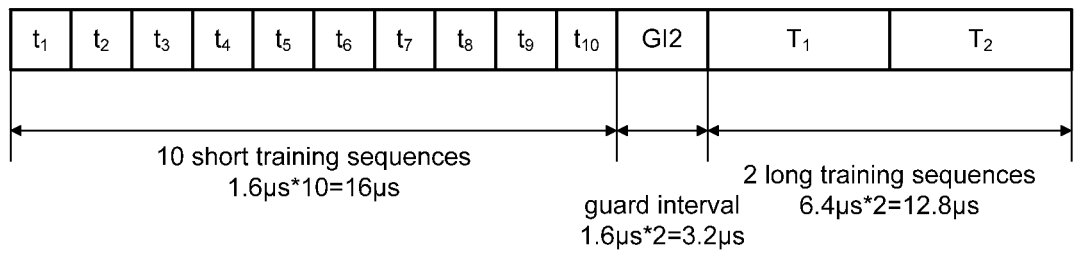
FIG. 1 illustrates an example of a complete training sequence of 802.11 protocol.
Figure 2:
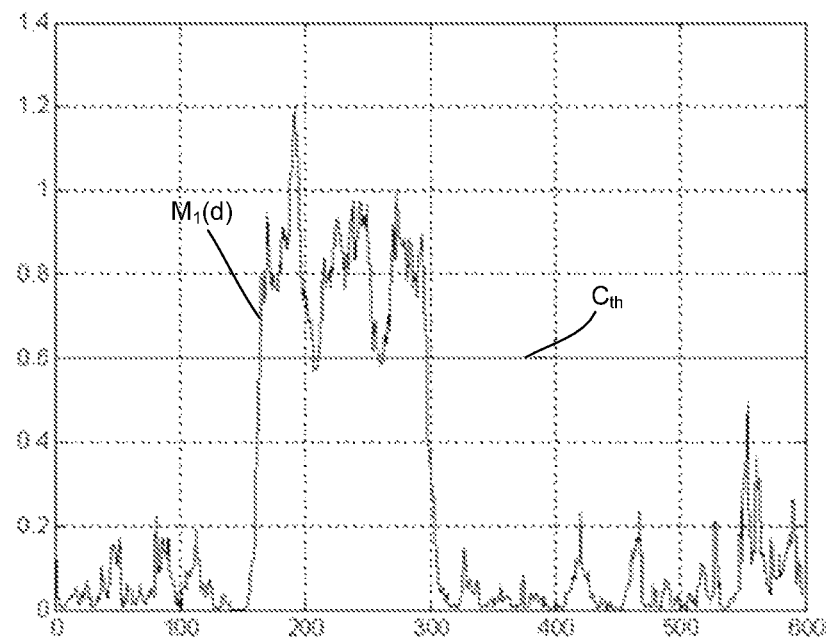
FIG. 2 illustrates an example of how a data frame is detected by a conventional method.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 3:
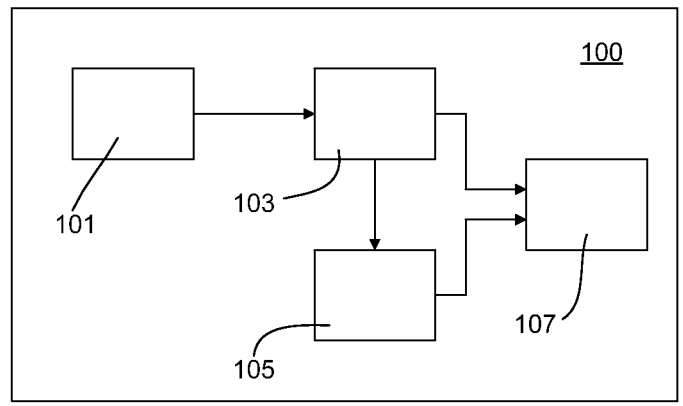
FIG. 3 illustrates a schematic block diagram of a coarse timing system according to one embodiment of the present application.

FIG. 3 illustrates a schematic block diagram of a coarse timing system 100 in a communication system. The system 100 includes a signal receiving device 101 for receiving signal samples, a timing metric value calculating device 103 for calculating self-correlation based timing metric values of the signal samples received by the signal receiving device 101, an average timing metric value calculating device 105 for calculating average timing metric values for the received signal samples based on previous timing metric values; and a data frame detecting device 107 for determining whether there is a data frame based on the timing metric values calculated by the timing metric value calculating device 103 and the average timing metric values calculated by the average timing metric value calculating device 105.

Figure 4:
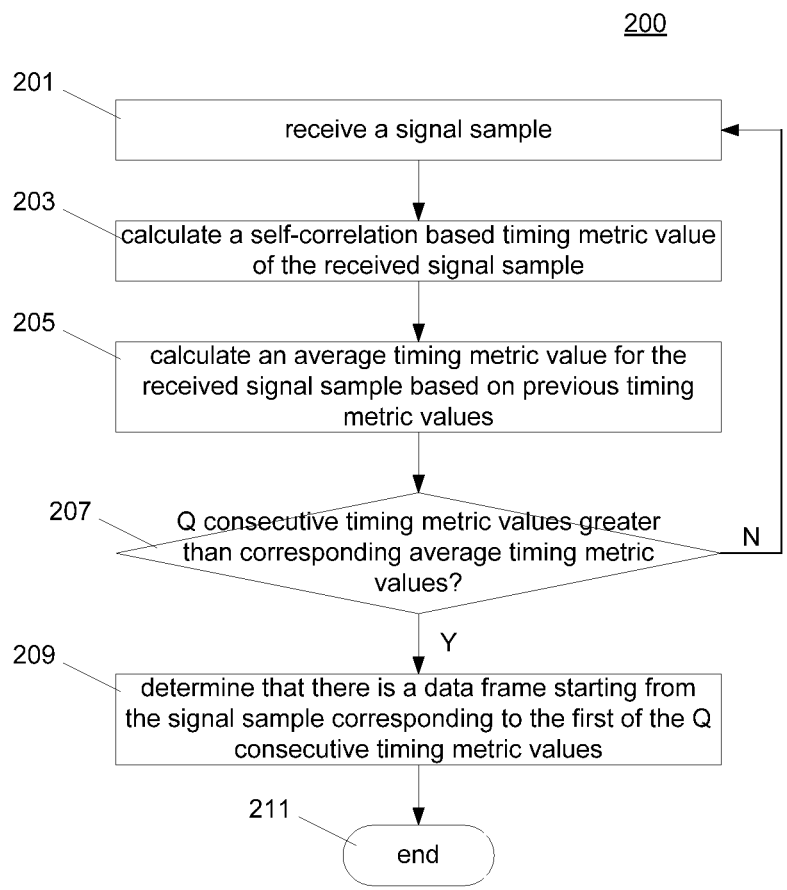
FIG. 4 illustrates a schematic flow chart of a coarse timing method according to one embodiment of the present application.

FIG. 4 illustrates a schematic flow chart of a coarse timing method 200 for communication systems.

In 201, receive a signal sample. A signal sample may be obtained by sampling a received signal. In digital signal processing, signal samples are used to represent a signal. According to one embodiment of the present application, signal samples are obtained by the signal receiving device 101. Then the signal receiving device 101 sends the received signal sample to the timing metric value calculating device 103.

In 203, calculate a self-correlation based timing metric value of the received signal sample. According to one embodiment of the present application, the timing metric value calculating device 103 calculates a timing metric value for each signal sample. Self-correlation based timing metric values may be calculated according to Equation (1):

$$M_1(d) = \frac{|P(d)|^2}{R^2(d)}, \quad \text{Equation (1)}$$

where d represents a position on the time axis,
where P(d) may be defined as Equation (2):

$$P(d) = \sum_{k=0}^{N/2-1} r(d+N/2+k)r(d+k), \quad \text{Equation (2)}$$

where r(n) represents the received signal, and N is a predetermined positive integer,
and where R(d) may be defined as Equation (3):

$$R(d) = \sum_{k=0}^{N/2-1} |r(d+N/2+k)|^2. \quad \text{Equation (3)}$$

N may be any suitable number. For example, N may be 6, 8, 10, 12, 14, etc. In addition, there are different ways to calculate timing metric values, and the scope of the present application is not limited to the above described method.

When a timing metric value is calculated, the timing metric value calculating device 103 sends the calculated timing metric value to both average timing metric value calculating device 105 and the data frame detecting device 107.

In 205, calculate an average timing metric value based on previous timing metric values. According to one embodiment of the present application, when the average timing metric value calculating device 105 receives a timing metric value, it calculates a corresponding average timing metric value based on previous timing metric values for the received signal sample.

In some embodiments, an average timing metric value may be calculated based on M previous consecutive timing metric values adjacent to the current timing metric value. The average timing metric value calculating device 105 may not calculate average timing metric value for the first M signal samples.

In some embodiments, average timing metric values may be calculated according to Equation (4):

$$M_{avg} = \frac{1}{M} \sum_{k=0}^{M-1} M_1(d-k); \quad \text{Equation (4)}$$

where, M may be any suitable positive integer. For example, M may be 2, 3, 4, 5, 6, 8, 10, 20, 30 etc. In some embodiments, M may equal to the length of a short training sequence.

In 207, determine whether there are Q consecutive timing metric values greater than corresponding average timing metric values. According to one embodiment of the present application, the data frame detecting device 107 receives timing metric values from the timing metric value calculating device 103 and average timing metric values from the average timing metric value calculating device 105. Then, the data frame detecting device 107 compares the current timing metric value with the greatest average timing metric value ever calculated till the current average timing metric value. If the current timing metric value is greater than the greatest average timing metric value ever calculated, increase a count by one; if not, reset the count to zero. If the count reaches Q, goes to 209; if not, goes to 201.

In 209, determine that there is a data frame starting from a signal sample corresponding to the first of the Q consecutive timing metric values. According to one embodiment of the present application, if there are Q consecutive timing metric values greater than corresponding average timing metric values, the data frame detecting device 107 determines that there is a data frame starting from a signal sample corresponding to the first of the Q consecutive timing metric values.

In 211, end coarse timing.

According to one embodiment of the present application, a time window having a predetermined length L may be defined, and if there are Q timing metric values greater than corresponding average timing metric values in the time window, the data frame detecting device 107 determines that there is a data frame starting from a signal sample corresponding to the end of the time window. For example, a time window having a length of L may be defined. Signal samples comes in the time window when they are received by the signal receiving device 101, and are forced out of the time window by new signal samples. Q is less than L, for example, it may be L−1, L−2, L−3, L−4 etc. It is believed that this can make the method tolerate certain errors, and error rate of the coarse timing may be further reduced.

EXAMPLE

An experiment was carried out at the below condition.
Vector of Delay Value (ns): [0 100 200 300 400 500 600 700];
Vector of Tap Power (dB): [0-11.2-19-21.9-25.3-24.4-28.0-26.1];
Doppler Frequency: 1 kHz
Thresholds of conventional method: 0.5, 0.6, and 0.7;
Range of SNR: −1 dB~20 dB.

In the experiment, Q was set as 140, which means when there are 140 consecutive timing metric values greater than corresponding average timing metric values, the timing metric reaches a "flat area", and there is a data frame starting from a signal sample corresponding to the first of the 140 consecutive timing metric values greater than corresponding average timing metric values.

The experiment was carried out as follows.

(1) Variables were initiated: d=2, α=−1, count=0, and β=0,
where d stands for position along the time axis, α stands for an adaptive iterative threshold, count stands for number of consecutive timing metric values greater than the adaptive iterative threshold, and β stands for the maximum average timing metric value.

(2) Calculate timing metric value based on auto-correlation of the received symbols, $$M_1(d) = \frac{|P(d)|^2}{R^2(d)} \quad \text{Equation (1)}$$

where $$P(d) = \Sigma_{k=0}^{15} r(d+k+16) r(d+k) \quad \text{Equation (6)},$$

and $$R(d) = \Sigma_{k=0}^{15} |r(d+k+16)|^2 \quad \text{Equation (7)}.$$

if (d≥16)
{Go to (3);}
else
{d=d+1; go to (2);}

(3) Calculate average timing metric value according to Equation (8):

$$M_{avg} = \frac{1}{16} \sum_{k=0}^{15} M_1(d-k). \quad \text{Equation (8)}$$

if (α = −1)
{α = $M_{avg}$; β = $M_{avg}$;}
else
{
if ($M_{avg}$ > β)
{β = $M_{avg}$}
}
go to (4);

(4) Compare α and timing metric value $M_1(d)$:

```
if (M_1(d)>α)
{
count=count+1;
if (count>140) { coarse estimation finishes;}
}
else
{
count=0;
α=β;
}
d=d+1;
go to (2).
```

Figure 5:
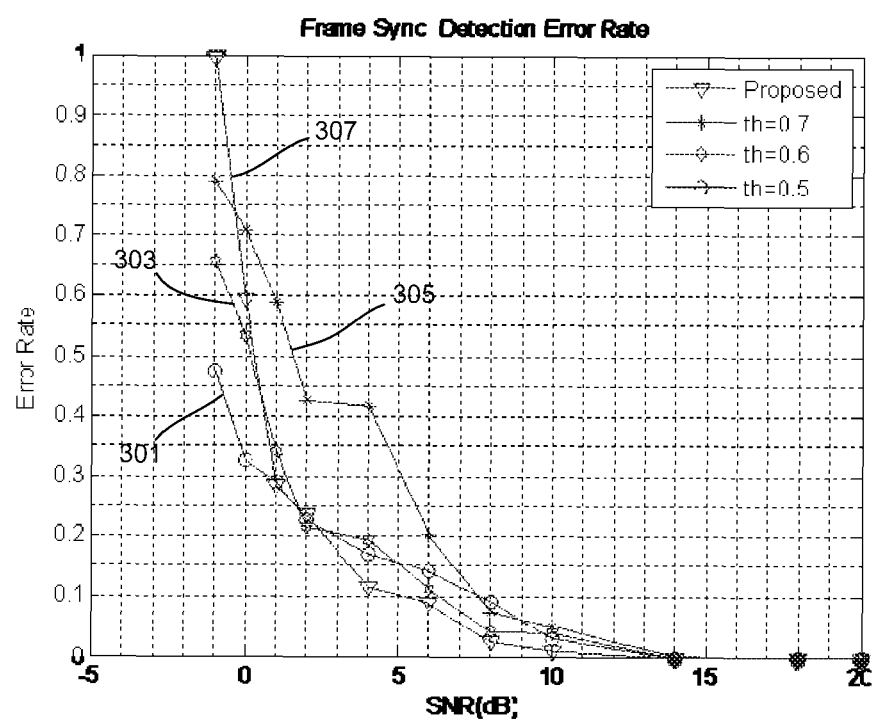
FIG. 5 illustrates error rate plots of conventional methods and a method of the present application obtained in an experiment.

FIG. 5 illustrates error rate plots of conventional method and a method of the present application obtained under the above condition. Line 301 represents error rate of the conventional method with the threshold of 0.5, Line 303 represents error rate of the conventional method with the threshold of 0.6, Line 305 represents error rate of the conventional method with the threshold of 0.7, and Line 307 represents error rate of the method of the present application.

It can be seen from FIG. 5 that under the above conditions, the performance of the method of the present application is better than conventional method when SNR is greater than 2 dB. It is believed that the performance of the method of the present application under a SNR less than 2 dB may be improved if an error tolerant mechanism is used. For example, a time window having a length of L may be pre-defined, where L is greater than Q, as long as there are Q timing metric values in the time window which are greater than corresponding average timing metric values, then determine that there is a data frame. In this embodiment, it may not require that the Q timing metric values are consecutive, thus error tolerance of the method may be improved, and the chance that a data frame is missed because of low error tolerance may be reduced.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A coarse timing method, comprising:
    calculating, via a processor, self-correlation timing metric values for received signal samples;
    calculating, via the processor, average self-correlation timing metric values for the received signal samples based on previous timing metric values; and
    when there are Q consecutive self-correlation timing metric values greater than the average self-correlation timing metric values, determining that a data frame is present, where Q is a predetermined positive integer.

2. The method of claim 1, further comprising when there are Q consecutive timing metric values greater than corresponding average timing metric values, determining that the data frame substantially from a signal sample corresponding to the first of the Q consective timing metric values.

3. The method of claim 1, wherein the timing metric values are calculated according to:

$$M_1(d) = \frac{|P(d)|^2}{R^2(d)}$$

where d stands for position on the time axis,
where P(d) is defined as:

$$P(d) = \sum_{k=0}^{N/2-1} r(d+N/2+k)r(d+k)$$

where r(n) represents the received signal, and N is a predetermined positive integer,
and where R(d) is defined as:

$$R(d) = \sum_{k=0}^{N/2-1} |r(d+N/2+k)|^2.$$

4. The method of claim 1, wherein an average timing metric value is calculated based on M consecutive previous timing metric values, where M is a predetermined positive integer.

5. The method of claim 4, wherein the average timing metric value is calculated according to:

$$M_{avg} = \frac{1}{M}\sum_{k=0}^{M-1} M_1(d-k).$$

6. A coarse timing system, comprising:
   a timing metric value calculating device for calculating self-correlation timing metric values of received signal samples;
   an average timing metric value calculating device for calculating average self-correlation timing metric values based on previous timing metric values; and
   a data frame detecting device for determining a data frame is present when there are Q consecutive self-correlation timing metric values greater than the average self-correlation timing metric values.

7. The system of claim 6, wherein Q is a predetermined positive integer.

8. The system of claim 7, wherein, when there are Q consecutive timing metric values greater than corresponding average timing metric values, the data frame detecting device further determines that the data frame substantially starts from a signal sample corresponding to the first of the Q consecutive timing metric values.

* * * * *